US010213831B2

(12) United States Patent
Ederer et al.

(10) Patent No.: US 10,213,831 B2
(45) Date of Patent: Feb. 26, 2019

(54) CONSTRUCTION OF A 3D PRINTING DEVICE FOR PRODUCING COMPONENTS (71) Applicant: Voxeljet AG, Friedberg (DE)

(72) Inventors: Ingo Ederer, Geltendorf (DE); Andreas Dominik Hartmann, Stadtbergen (DE); Dominik Schmid, Augsburg (DE)

(73) Assignee: VOXELJET AG, Friedberg (DE)

( * ) Notice: Subject to any disclaimer, the term of this patent is extended or adjusted under 35 U.S.C. 154(b) by 717 days.

(21) Appl. No.: 14/443,225

(22) PCT Filed: Nov. 21, 2013

(86) PCT No.: PCT/DE2013/000685
§ 371 (c)(1),
(2) Date: May 15, 2015

(87) PCT Pub. No.: WO2014/079404
PCT Pub. Date: May 30, 2014

(65) Prior Publication Data
US 2015/0290881 A1    Oct. 15, 2015

(30) Foreign Application Priority Data

Nov. 25, 2012  (DE) ........................ 10 2012 022 859

(51) Int. Cl.
*B29C 67/00*     (2017.01)
*B22F 3/105*     (2006.01)
(Continued)

(52) U.S. Cl.
CPC ............ *B22F 3/1055* (2013.01); *B28B 1/001* (2013.01); *B29C 64/141* (2017.08);
(Continued)

(58) Field of Classification Search
CPC .......... B33Y 10/00; B33Y 30/00; B33Y 50/00
See application file for complete search history.

(56) References Cited

U.S. PATENT DOCUMENTS 143,613 A    10/1873  Bucklin
3,913,503 A  10/1975  Becker
(Continued)

FOREIGN PATENT DOCUMENTS

AU    720255 B2    5/2000
DE    3221357 A1   12/1983
(Continued)

OTHER PUBLICATIONS

US 4,937,420, 06/1990, Deckard (withdrawn)
(Continued)

*Primary Examiner* — Ryan M Ochylski
(74) *Attorney, Agent, or Firm* — The Dobrusin Law Firm, P.C.

(57) ABSTRACT

The invention relates to a device for producing three-dimensional models, comprising a coater, which includes an ejection opening, at least one print head, which is mounted on a print axis, the ejection opening of the coater being disposed toward the top in the coating direction, and the print head being disposed counter to the coating direction with the opposite orientation on the printing axis behind the coater in the coating direction; the invention also relates to a method for producing three-dimensional models.

21 Claims, 3 Drawing Sheets (51) Int. Cl.
*B28B 1/00* (2006.01)
*B29C 64/141* (2017.01)
*B29C 64/153* (2017.01)
*B29C 64/165* (2017.01)
*B29C 64/35* (2017.01)
*B33Y 10/00* (2015.01)
*B33Y 30/00* (2015.01)
*B33Y 40/00* (2015.01)
*B29K 105/00* (2006.01)

(52) U.S. Cl.
CPC .......... *B29C 64/153* (2017.08); *B29C 64/165* (2017.08); *B29C 64/35* (2017.08); *B22F 2003/1059* (2013.01); *B29K 2105/251* (2013.01); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |

(56) References Cited

U.S. PATENT DOCUMENTS

| | | |
|---|---|---|
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0280185 A1 | 12/2005 | Russell et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2007/0045891 A1 | 3/2007 | Martinoni et al. |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |

(56) References Cited

U.S. PATENT DOCUMENTS

| | | |
|---|---|---|
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Kim et al. |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0106595 A1 | 4/2017 | Gunther et al. |
| 2017/0136524 A1 | 5/2017 | Ederer et al. |

FOREIGN PATENT DOCUMENTS

| | | |
|---|---|---|
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102009056696 A1 | 6/2011 |
| DE | 102010015451 A1 | 10/2011 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 0361847 B1 | 4/1990 |
| EP | 0431924 B1 | 6/1991 |
| EP | 1415792 | 5/2004 |
| EP | 1457590 A | 9/2004 |
| EP | 1381504 B1 | 8/2007 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| WO | 01/40866 A2 | 6/2001 |
| WO | 2001/078969 A2 | 10/2001 |
| WO | 2004/014637 A1 | 2/2004 |
| WO | 2008/049384 A1 | 5/2008 |
| WO | 2008061520 A2 | 5/2008 |
| WO | 2011063786 A1 | 6/2011 |
| WO | 2011/127897 A2 | 10/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

Translation of the International Search Report, Application No. PCT/DE2013/000685, dated Mar. 27, 2014.

International Preliminary Report on Patentability and Written Opinion of the International Search Authority, Application No. PCT/DE2013/000685, dated Mar. 27, 2014.

Armin Scharf, "Erster 3D-Endlosdrucker", zwomp.de, http://www.zwomp.de/2012/11/06/voxeljet-endlosdricker/ dated Nov. 6, 2012.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, p. 130-133.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine, with Brief Summary, Feb. 22, 2005.

Jacobs et al., 2005 SME Technical Paper, title "Are QuickCast Patterns Suitable for Limited Production?".

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

Williams, "Feasibility Study of Investment Casting Pattern Design by Means of Three Dimensional Printing", Department of Mechanical Engineering, abstract only; Sep. 25, 2001.

Voxeljet's VXconcept- Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.

Screen shots of URL: http://www.youtube.com/watch?v=hgIrNXZjIxU taken in approximately 5 second intervals on Nov. 12, 2015.

CONSTRUCTION OF A 3D PRINTING DEVICE FOR PRODUCING COMPONENTS

FIELD

The invention relates to a device as well as a method for constructing three-dimensional models in layers.

CLAIM OF PRIORITY

This application is a national phase filing under 35 USC § 371 from PCT Application serial number PCT/DE2013/000685 filed on Nov. 21, 2013, and claims priority therefrom. This application further claims priority from German Patent Application DE 10 2012 022 859.7 filed on Nov. 25, 2012. PCT/DE2013/000685 and DE 10 2012 022 859.7 are both incorporated herein in their entireties by reference.

BACKGROUND

A method for producing three-dimensional models from computer data is described in the European patent specification EP 0 431 924 B1. A first material, a particulate material in this case, is applied in a thin layer onto a building platform, which, if necessary, is surrounded by a container, and a second material, which may form a solid with the first material, is subsequently applied thereupon. According to EP 0 431 924 B1, a particulate material is provided, for example, as the first material, and a binder material is then selectively printed onto the particulate material using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a desired height of the model is achieved. A three-dimensional model is thereby produced from the printed and solidified areas.

After it is completed, the model produced from solidified particulate material is embedded in loose particulate material and is subsequently removed therefrom.

Other powder-supported rapid prototyping processes work in a similar manner, for example selective laser sintering or electron beam sintering, in which a loose particulate material is also deposited in layers and selectively solidified with the aid of a controlled physical radiation source.

All these methods are referred to collectively below as "three-dimensional printing methods" or 3D printing methods.

Another method for constructing a layered body from loose particulate material is known from WO2011/127897A2. The build process takes place according to the "continuous 3D printing" principle and is another variant of the powder-processing 3D printing method.

SUMMARY

It is possible to produce continuous components, also referred to as molded parts, using an endless, horizontal layer feed.

In continuous 3D printing, the component length is almost unlimited.

In conventional systems, the components are produced in layers vertically from top to bottom. If the component size exceeds the building height predefined for the specific system, the component must be segmented and produced in multiple build processes. For this purpose, the finished components must be consecutively removed from the system and placed on each other to form an accurate fit and glued. In this case, the production of large components is limited in terms of size and productivity.

In continuous 3D printing, the layer feed takes place in the horizontal direction using a continuous conveyor belt. Since gravity prevents a layer from being applied perpendicularly to the layer feed, the individual layers are applied spatially at an angle to the perpendicular. The angle is selected in such a way that it is smaller than the specific angle of repose of the corresponding powder material.

The build plane abuts an enclosed conveyor line, whose length is adapted, e.g., to the method-dependent hardening duration. At the end of the conveyor line, the finished components enter a removal area or unpacking area. There, the components are freed of unbound powder material and removed without having to interrupt the production of additional parts. In the case of particularly long parts, this area may be expanded, e.g., with roller tracks.

However, the known devices and methods for building models, also referred to as molded parts, in layers, have construction-induced disadvantages which may result in inaccuracies or defects in the molded parts during their manufacture. In known devices and methods, for example, the coater is moved back over the coated plane after the coating operation. It is possible for particulate material to undesirably detach from the coater and fall onto the build plane (build space). Particulate material may thus come to rest in places where it is not intended to be. As a result, a collision between the print head and an accumulation of particulate material thus created may occur. This may damage both the print head and the build space and thus the components.

It is equally unfavorable when fluids enter the build space uncontrollably. They may damage the build space and thus the molded body to be produced and even render the produced molded parts unusable.

As a result, there has long been a need to avoid or at least reduce the aforementioned disadvantages of the prior art.

The object of the present invention is therefore to provide a device and a method which avoid or at least improve the disadvantages of the prior art and with which the method for producing molded parts may be carried out in an improved manner.

The object according to the invention is achieved by the device according to claim 1 and the method according to claim 9.

Preferred embodiments are implemented in the subclaims.

In particular, the invention relates to a device and a method for producing three-dimensional models or molded parts, the device being characterized by an advantageous arrangement of the function units. In particular, this construction in layers according to the invention is used in the inclined bed method of 3D printing.

DETAILED DESCRIPTION

The different aspects of the invention are illustrated in greater detail below.

In one aspect, the invention is a device for producing three-dimensional models, comprising a coater (1) which has an ejection opening, at least one print head (2), which is mounted on a print axis, the ejection opening of the coater being disposed at the top in the coating direction and the print head being disposed counter to the coating direction with the opposite orientation on the print axis behind the coater in the coating direction.

All known coaters may be used which are suitable for implementing the idea of the invention. The coater may be any coater which has a leveling element, or a means having the same function, counter to the coating direction. This prevents particulate material from being able to slide or fall down in the direction of the print head. Any embodiments may be used which push the particulate material to be applied upward, such as rollers, blades, lips, etc., and which prevent a described sliding of the particulate material.

The special arrangement of the print head and coater is particularly advantageous during operation of the system, since the print head and the coater may immediately approach the peripheral units after each operation. With this arrangement, a new layer of particulate material may furthermore be applied to the build space when the coater is lifted. In the sense of the invention, "lifting" means that the coater moves upward over the build space at an inclined angle with respect to the horizontal. This prevents the particulate material from being able to fall over the build space. When lowered, the print head may then print the areas which need to be solidified to produce the molded part. In the sense of the invention, "lowering" means that the print head moves downward counter to the coating direction at an inclined angle with respect to the horizontal and parallel to the build space. This prevents an undesirable deposition of particulate material on the build space, whereby the particle layer would become uneven and the print head could collide with deposits of this type.

The device according to the invention furthermore comprises a coater cleaning unit (3), a coater filling unit (4), a central particulate material supply unit (6), a conveyor belt (7), an inspection unit (10), a print head cleaning unit with a spitting station (11), a capping station (12), a drop barrier (13), a collecting hopper (14), a conveyor line for excess particulate material (15), a collecting hopper in the unpacking area (16) and/or one or multiple channels (19).

In one preferred embodiment, the units of the coater peripheral units, preferably the coater cleaning unit (3), the coater filling unit (4) and the central particulate material supply unit (6) are disposed at the top in the coating direction, particularly preferably behind the build space.

The units of the print head periphery, preferably an inspection unit (10), a print head cleaning unit with a spitting station (11) and a capping station (12) are preferably disposed at the bottom in the coating direction, particularly preferably below the build space.

With the aid of the device according to the invention, a central particulate material conveyor may be disposed above the build space for automatically constructing the start feedstock.

Collecting hoppers may furthermore be disposed below the device (system) for collecting excess particulate material. One collecting hopper is preferably disposed at the front below the build space for collecting the excess or falling particulate material. Another collecting hopper is preferably disposed below the unpacking area.

The collecting hoppers preferably empty downward toward a conveyor line, which further conveys the particulate material and is also disposed on the bottom of the machine. The particulate material collected in this manner may then be reused. A "collecting line" in the sense of the invention is any suitable means for transporting the particulate material collected in this manner in one direction, preferably into a recycling container. For example, a screw conveyor may be used.

The conveyor line preferably has a central conveyor section, which is used to empty the collecting hoppers on the front side of the device and the collecting hopper in the unpacking area.

In another aspect, the invention relates to a method for producing three-dimensional models, a device according to the invention being used according to one of the aspects described above. In one method according to the invention, a start feedstock may be constructed with the aid of the device. A "start feedstock" is necessary to facilitate a startup of the manufacturing process and to provide a start surface made of particulate material, on which the coating with particulate material and subsequent printing with the print head may take place.

In one preferred embodiment of the invention, a coater applies thin layers of a particulate material. For this purpose, it travels along a linear drive system.

The coater preferably comprises a hopper which includes a gap-like opening in the vicinity of the coating plane. The ejection gap of the coater then preferably points in the coating direction. Upon excitation of the coater, particulate material emerges from this gap onto the coating plane. Roller coaters or blade coaters or combinations thereof are suitable as coaters. In all types, it is advantageous if the layer application takes place in the direction of the ascending coating plane and not the other way round, since this makes it possible to prevent the particulate material situated in front of the coater from sliding over the coating plane. With this orientation of the coater according to the invention, it is advantageously achieved that the coating is very even and remains stable. This also avoids undesirable and disadvantageous interactions from occurring between material provided for the coating and excess material.

The print head, which is preferably mounted on an orthogonal linear system, passes over the build space in a rastering process. In the rastering process, a distinction is made between the direction in which a strip the width of the print head is generated (print axis) and the direction in which the print head is offset by one strip width (print head positioning axis). The print head preferably travels downward in a meandering pattern.

A conventional binder, which is adapted to the particulate material, is preferably used. Particulate material/binder combinations are generally known and therefore do not need to be named explicitly.

The print head may also be preferably replaced by a radiation source or another suitable means for an energy-rich supply of radiation. In this case, the remaining components of the device are adapted accordingly.

In the present invention, the print head is preferably positioned in the coating direction and printing takes place orthogonally thereto. The present invention is furthermore preferably characterized in that the print axis and the coater move on a common axis pair. This means that the print head positioning axis is simultaneously the coater axis. However, in another preferred embodiment, it is also possible for the coater and the print head positioning axis to move on separate axis pairs.

In the build process of the present invention, one layer of particulate material is first applied from bottom to top. The print head then passes over the build space in the rastering process from top to bottom, counter to the coating direction, and applies extremely fine droplets of binder. Alternatively a print head the same width as the build space may be mounted, which prints the entire build space in one pass. The printing operation would then take place during the travel of the print head-coater unit to the lower edge of the build space.

In the proposed device, the coater passes over the build space another time during the rastering travel of the print head without applying a layer. The print head then moves in front of the coater during the printing operation. If particulate material undesirably falls down, it cannot disturb the printing operation. According to the invention, it is thus advantageously achieved that the molded parts to be produced are of very high quality in terms of precision. In another preferred embodiment, the ejection opening of the coater is oriented in the coating direction, and the print axis is preferably situated behind the coater. The print head is thus disposed counter to the coating direction, i.e., in relation to the inclined build space, the coater is disposed toward the top in relation to the print axis and the print head, the ejection opening and the print head being essentially oriented in opposite directions. In this device arrangement according to the invention, the peripheral units for the print head, i.e., for example the inspection unit (10), the print head cleaning unit (11), the capping station (12) and the drop barrier (13), are disposed in the lower area of the device plane. These components are thus disposed in a manner that is easily accessible to the operator and is user-friendly.

The coater cleaning unit (3) and the coater filling unit (4) are preferably disposed at the top of the device, preferably in front of the build space.

This arrangement also has the advantage that, after each cycle of coating and printing, the coater and print head function units may be moved to the peripheral units for the purpose of checking their flawless operation. This increases the quality of the molded parts to be produced in a time-saving manner. It is provided to be able to individually control how often the coater or the print head is moved to the peripheral units during the printing operation. This may take place after each coating or printing operation or at longer intervals, e.g., after each second or fourth operation.

The peripheral units of the coater comprise all functions for keeping the coater intact during and between the build processes.

The peripheral units of the print head are preferably: cleaning station, capping station, drop barrier, spitting station, drop scales and inspection unit.

In the cleaning station, the nozzle plate on the bottom of the print head is actively cleaned from the bottom during a special pass, e.g., using a rotating sponge roller.

The capping station closes the nozzle plate on the bottom of the print head with the aid of an extendable stamp and thus protects it against contamination and drying out between the build processes.

The drop barrier actively checks the nozzle plate on the bottom of the print head for deposits, such as drops or foreign bodies, using a light barrier, and causes the print head to be cleaned, if needed.

The spitting station collects drops and vapors from the print head when the latter clears itself for internal cleaning.

The drop scales supply the corresponding information for modularizing the drop size.

The inspection unit is a special access point in the system, which enables the bottom of the print head to be inspected and test printouts to be run on paper.

All the peripheral units which support the function of the print head are mounted on the lower front of the device according to the invention, which may also be referred to as the system, and are thus easily accessible to the operator.

The fluid supply may be advantageously disposed, due to the arrangement of the print head periphery in this location.

Damages in the fluid system, or fluids which must be replaced during operation, are thus guided downward and cannot be distributed over the build space and the machine drives. This prevents fluids of this type from damaging the build space or contaminating the print head or the coater. The feed line for supplying fluid may thus also be kept short.

The coater periphery comprises the coater filling unit and the coater cleaning unit. The coater filling unit is advantageously disposed above the upper edge of the build space.

The coater carries along a certain stock of particulate material during the build process. From time to time, the stock must be replenished with particulate material from the coater filling unit. During the build process, the bottom of the coater or the coater ejection gap may become so dirty over time that the coater is no longer able to apply flawless coats. At the same time, the ejection gap may be contaminated.

The device thus preferably comprises a coater cleaning station. It cleans the bottom of the coater, including the ejection gap, using a brush which passes over the coater perpendicularly to the coating direction.

Particulate material falls off the coater both during the filling operation of the coater and during the cleaning thereof.

With the aid of the device according to the invention, falling particulate material is advantageously prevented from reaching the build space.

Due to the arrangement of the coater periphery above the build space according to the invention, leftover powder falls onto the finished feedstock and is thus safely transported away.

The coater filling unit is preferably supplied with particulate material centrally via an ejection point above and behind the build space.

It is possible to automatically construct the start feedstock needed for the build process through this ejection point. As an alternative to the automatic construction of the start feedstock according to the invention, it would otherwise be necessary to insert blocks, inclined plates, or to apply the particulate material by hand, so that the start layer and subsequent layers may be applied at the prescribed angle.

Due to the central arrangement of the ejection point, the transport paths of the particulate material are kept short and may pass outside the system without problems.

By keeping the conveyor line short, both the fresh particulate material and the conveyor system are protected.

During the build process, particulate material accumulates on the side of the build space and beneath the build space during coating, as a result of the process, and must be disposed of.

In one preferred embodiment, this particulate material is collected in channels on the side of the build space, which are situated at a steeper angle than the build plane, to the extent that particulate material contained therein slides downward due to gravity. A central container is preferably situated below the build space, into which the two side channels empty, so that the leftover particulate material may be collected there. This container is particularly preferably provided with an opening along the lower build space edge, so that leftover particulate material may also be collected there, which is transported over the build space and into the container, e.g., with the aid of the coater.

The central container is preferably transported out of the system with the aid of a conveyor line, e.g., a conveyor spiral or a conveyor screw on the bottom of the system.

This conveyor line may also transport leftover particulate material which accumulates behind the system during the unpacking operation. Conveyor lines are thus reduced and the cleanliness of the build process is guaranteed.

One particularly preferred aspect of the invention is the combination of the central particulate material supply, which continuously fills the coater. The start feedstock may also be advantageously constructed hereby, so that a manual construction of the start feedstock, which was previously necessary, is dispensed with. This is a great advantage, among other things, with respect to time savings and the manageability of the method.

Another advantageous aspect of the invention is the mounting of a disposal system, which makes it possible not only to collect fallen particulate material and return it to the production process but also to supply the leftover particulate material from the unpacking as a whole to the recycling function in the method. Collecting hoppers are preferably mounted on the front side of the device, below the device and below the unpacking area, which are provided with a common conveyor line, which supplies the material to be recycled to a recycling container. The particulate material recovered in this manner is preferably subjected to treatment steps which remove process-induced contaminants therefrom. It is then fed back into the 3D printing process. A structure of this type is illustrated, for example, in FIG. 3.

The invention also relates to a method for producing three-dimensional models (molded bodies).

One particular advantage of the method according to the invention is that, during startup, the start feedstock does not have to be constructed by hand, but instead an automatic startup is possible, due to the special design of the device. Previously, it was necessary to build up the start feedstock by hand, so that the 3D process using the construction in layers could begin. The device and method according to the invention were able to overcome this disadvantage and thus provide a faster and more straightforward method.

Preferred embodiments are illustrated in the figures:

Figure 1:
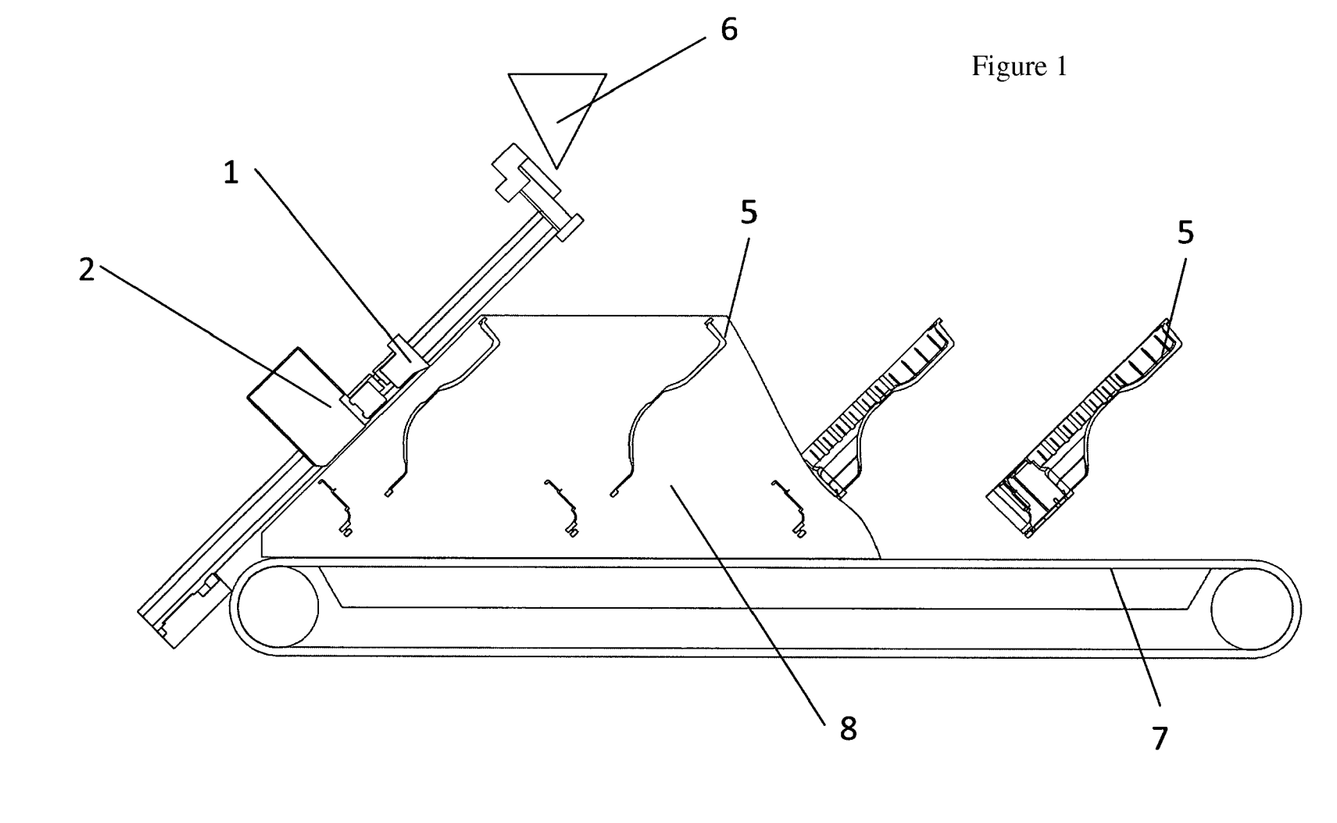

FIG. 1 shows the functional principle of the continuous 3D printing process. The left side shows the front side of the machine, including the build space on which the components are produced in layers. The application of the individual layers takes place at an angle which is smaller than the specific angle of repose of the processed particulate material. Conveyor belt (7) moves feedstock (8) to the right to the back of the machine. Finished components may be removed here.

Figure 2:
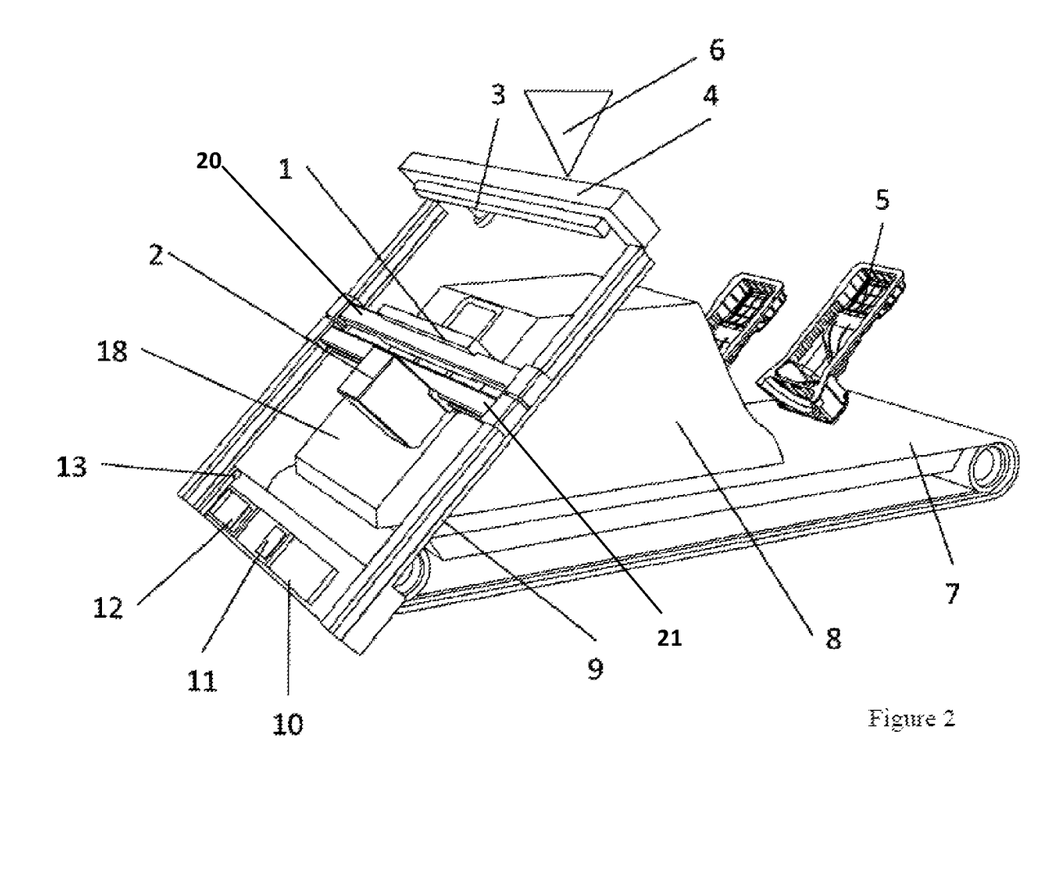

FIG. 2 shows the preferred structure of the invention. Axis system (9), which positions the print head, is disposed to the left and right of build space (18) on the front side of the machine. Coater filling unit (4) and coater cleaning unit (3) are situated at the top behind the build space. Excess particulate material from the cleaning or filling operation of the coater fall onto the feedstock without problems. The coater may be mounted on a coater axis (20) that travels on an inclined axis (9), preferably with the ejection opening of the coater oriented above the coater axis in an inclined direction. The print head may be mounted on a print head positioning axis (21) that travels on an inclined axis (9), preferably with the print head oriented below the print head positioning axis in an inclined direction.

Particulate material supply unit (6) is situated centrally behind the coater filling unit. The latter may either supply the coater filling unit (4) with particulate material or automatically produce the necessary start feedstock before the start of a job. The print head periphery is situated in an easily accessible location beneath the build space.

Figure 3:
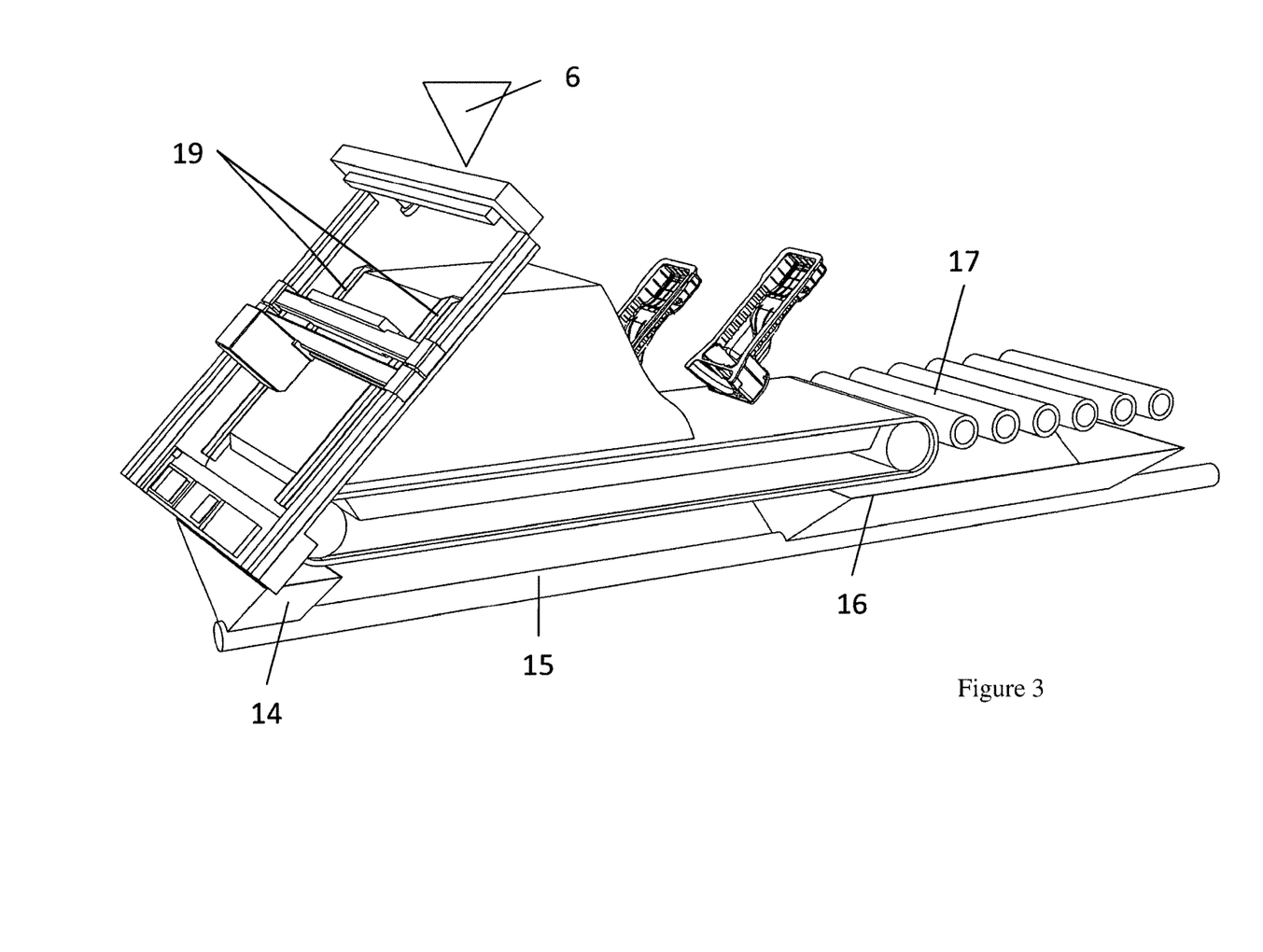

FIG. 3 shows the disposal paths of the excess particulate material. Channels (19), which collect excess particulate material from the build process and conduct it to the collecting hopper on front side (14), are situated to the left and right of build space (18). Conveyor line (15) runs along the bottom of the machine and empties collecting hopper (14). The conveyor line also empties collecting hoppers (16) from the unpacking area on the back of the machine.

LIST OF REFERENCE NUMERALS

1. Coater
2. Print head
3. Coater cleaning unit
4. Coater filling unit
5. Finished component
6. Central particulate material supply unit
7. Conveyor belt
8. Feedstock
9. Axis system
10. Inspection unit
11. Print head cleaning unit with spitting station
12. Capping station
13. Drop barrier
14. Collecting hopper, front side
15. Conveyor line, waste
16. Collecting hopper, unpacking area
17. Roller path of unpacking area
18. Build space
19. Channels
20 Coater axis
21 Print head positioning axis

What is claimed is:

1. A device for producing three-dimensional models, comprising:
   a coater having an ejection opening for layer-wise depositing a particulate material on a build surface having an incline; and
   at least one print head;
   wherein the print head is mounted on an inclined print axis,
   wherein the coater deposits the particulate material only while the coater moves in a coating direction up an incline in advance of the print head,
   the ejection opening of the coater being disposed toward the top in the coating direction, and
   the print head prints on the deposited layer of the particulate material only after reaching a top region of the incline until reaching a bottom region of the incline, while moving in advance of the coater.

2. The device according to claim 1, comprising a coater cleaning unit, a coater filling unit, a central particulate material supply unit, a conveyor belt, an inspection unit, a print head cleaning unit with a spitting station, a capping station, a drop barrier, a front collecting hopper, a conveyor line for waste, a collecting hopper in an unpacking area, or one or multiple channels.

3. The device according to claim 1, wherein the device includes coater peripheral units including a coater cleaning unit, a coater filling unit, and a central particulate material supply unit, wherein the coater peripheral units are disposed toward the top in the coating direction.

4. The device of claim 3, wherein the coater peripheral units are disposed behind a build space of the device.

5. The device according to claim 1, wherein the device includes print head periphery units including an inspection unit, a print head cleaning unit with a spitting station, and a capping station, wherein the print head periphery units are disposed toward the bottom in the coating direction.

6. The device of claim 5, wherein the print head periphery units are disposed below a build space of the device.

7. The device according to claim 1, wherein the device includes a central particulate material conveyor disposed above a build space for automatically constructing a start feedstock.

8. The device according to claim 1, wherein the coater applies layers of a particulate material on a build space and the device includes a front collecting hopper disposed toward a front of the build space and below the build space for collecting an excess of the particulate material.

9. The device according to claim 1, wherein the coater applies layers of a particulate material on a build space and a conveyor line for excess particulate material is disposed on a bottom of the build space.

10. The device according to claim 9, wherein
the coater applies layers of a particulate material on a build space and the device includes a front collecting hopper disposed toward a front of the build space and below the build space for collecting an excess of the particulate material;
the conveyor line has a central conveyor section, which is used to empty front collecting hoppers on the front side and a collecting hopper in the unpacking area.

11. The device according to claim 1, comprising a coater cleaning unit, a coater filling unit, a central particulate material supply unit, a conveyor belt, an inspection unit, a print head cleaning unit with a spitting station, a capping station, a drop barrier, a front collecting hopper, a conveyor line for waste, a collecting hopper in an unpacking area, and one or multiple channels.

12. The device according to claim 11, wherein the device includes coater peripheral units, including the coater cleaning unit, the coater filling unit, and the central particulate material supply unit, wherein the coater peripheral units are disposed toward the top in the coating direction.

13. The device according to claim 12, wherein the device includes print head periphery units including, the inspection unit, the print head cleaning unit with the spitting station, and the capping station, wherein the print head periphery units are disposed toward the bottom in the coating direction.

14. The device according to claim 13, wherein the central particulate material conveyor is disposed above a build space for automatically constructing a start feedstock.

15. The device according to claim 14, wherein the coater applies layers of a particulate material on a build space and the device includes the front collecting hopper disposed toward a front of the build space and below the build space for collecting an excess of the particulate material.

16. The device according to claim 15,
wherein the coater applies layers of a particulate material on a build space and the device includes the conveyor line for excess particulate material disposed on a bottom of the build space.

17. The device according to claim 16, wherein the conveyor line has a central conveyor section, which is used to empty the front collecting hopper and the collecting hopper in the unpacking area.

18. The device of claim 17, wherein the peripheral coater units are disposed behind a build space of the device; and the print head periphery units are disposed below the build space of the device.

19. The device of claim 1, wherein the print head travels downward in a meandering pattern where the print head prints a row while moving along a print axis and then moves along a print head positioning axis for printing a next row.

20. The device of claim 1, wherein the print head has a width that is about the same as a width of the build surface and the print head prints on the deposited layer of the particulate material only while moving in a printing direction down the incline in advance of the coater.

21. A device for producing three-dimensional models, comprising:
a coater having an ejection opening for layer-wise depositing a particulate material on a build surface having an incline; and
at least one print head;
wherein the print head is mounted on a print head positioning axis that travels on an inclined print axis,
wherein the coater is mounted on a coater axis orthogonal to the inclined print axis and deposits the particulate material only while the coater moves in a coating direction up the inclined print axis,
the ejection opening of the coater being disposed toward the top in the coating direction, and
the print head prints on the deposited layer of the particulate material only after reaching a top of the incline until reaching a bottom of the incline;
wherein the ejection opening and the print head have opposite orientations with the election opening oriented above the coater axis in an inclined direction and the print head oriented below the print head positioning axis in the inclined direction.

* * * * *

UNITED STATES PATENT AND TRADEMARK OFFICE
CERTIFICATE OF CORRECTION

PATENT NO. : 10,213,831 B2
APPLICATION NO. : 14/443225
DATED : February 26, 2019
INVENTOR(S) : Ingo Ederer et al.

Page 1 of 1

It is certified that error appears in the above-identified patent and that said Letters Patent is hereby corrected as shown below:

On the Title Page

Page 2, Column 1, Line 11, U.S. PATENT DOCUMENTS insert --4,937,420 06/1990 Deckard--
Page 3, Column 1, Line 52, U.S. PATENT DOCUMENTS insert --7,807,077 B2 05/2010 Ederer et al--

In the Claims

Column 10, Line 46, delete "the election opening" and insert --the ejection opening--

Signed and Sealed this
Seventh Day of May, 2019

Andrei Iancu
*Director of the United States Patent and Trademark Office*